United States Patent
Gupta et al.

(10) Patent No.: US 10,956,731 B1
(45) Date of Patent: Mar. 23, 2021

(54) HEADING IDENTIFICATION AND CLASSIFICATION FOR A DIGITAL DOCUMENT

(71) Applicant: Adobe Inc., San Jose, CA (US)

(72) Inventors: Mohit Gupta, Noida (IN); Uttam Dwivedi, Noida (IN); Shawn Alan Gaither, Raleigh, NC (US); Jayant Vaibhav Srivastava, Noida (IN); Ashutosh Mehra, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/597,318

(22) Filed: Oct. 9, 2019

(51) Int. Cl.
| | |
|---|---|
| G06K 9/00 | (2006.01) |
| G06F 40/258 | (2020.01) |
| G06F 3/0482 | (2013.01) |
| G06F 40/106 | (2020.01) |
| G06K 9/62 | (2006.01) |
| G06F 16/93 | (2019.01) |
| G06F 40/197 | (2020.01) |

(52) U.S. Cl.
CPC ......... *G06K 9/00469* (2013.01); *G06F 16/93* (2019.01); *G06F 40/106* (2020.01); *G06F 40/197* (2020.01); *G06F 40/258* (2020.01); *G06K 9/00456* (2013.01); *G06K 9/6201* (2013.01); *G06F 3/0482* (2013.01)

(58) Field of Classification Search
CPC .. G06F 40/137; G06F 40/258; G06K 9/00469
See application file for complete search history.

(56) References Cited

U.S. PATENT DOCUMENTS

| | | | |
|---|---|---|---|
| 10,013,488 B1 | 7/2018 | Zhao et al. | |
| 10,042,880 B1 * | 8/2018 | Bodapati | G06F 40/14 |
| 10,108,695 B1 * | 10/2018 | Yeturu | G06F 16/285 |
| 2003/0229854 A1 | 12/2003 | Lemay | |
| 2004/0006742 A1 * | 1/2004 | Slocombe | G06F 40/205 |
| | | | 715/234 |
| 2007/0043707 A1 | 2/2007 | Kulkarni et al. | |
| 2007/0237428 A1 | 10/2007 | Goodwin et al. | |
| 2008/0114757 A1 | 5/2008 | Dejean et al. | |

(Continued)

OTHER PUBLICATIONS

"Pre-Interview First Office Action", U.S. Appl. No. 16/664,335, dated Sep. 24, 2020, 4 pages.

(Continued)

*Primary Examiner* — Scott T Baderman
*Assistant Examiner* — Seung Woon Jung
(74) *Attorney, Agent, or Firm* — FIG. 1 Patents

(57) ABSTRACT

Techniques described herein implement heading identification and classification for a digital document in a digital medium environment. A document analysis system is leveraged to extract structural features from a digital document, identify heading candidates from among the structural features, validate the headings candidates, and classify validated headings into different headings types. The classified headings are then utilized to generate a sectioned version of the digital document ("sectioned document") that is divided into different sections based on the headings. Further, a document directory is generated that includes the headings and that enables navigation to different sections of the sectioned document.

20 Claims, 12 Drawing Sheets

(56) References Cited

U.S. PATENT DOCUMENTS

| | | | |
|---|---|---|---|
| 2011/0044539 A1* | 2/2011 | Kimura | G06K 9/00463 |
| | | | 382/165 |
| 2011/0055209 A1* | 3/2011 | Novac | G06Q 30/02 |
| | | | 707/737 |
| 2012/0297025 A1 | 11/2012 | Zeng et al. | |
| 2013/0124513 A1 | 5/2013 | Bignert et al. | |
| 2013/0191366 A1 | 7/2013 | Jovanovic et al. | |
| 2013/0283148 A1 | 10/2013 | Lim et al. | |
| 2014/0208192 A1 | 7/2014 | Zaric et al. | |
| 2016/0132219 A1 | 5/2016 | Shaw et al. | |
| 2016/0364608 A1* | 12/2016 | Sengupta | G06F 16/345 |
| 2018/0129944 A1 | 5/2018 | Meunier et al. | |
| 2018/0129989 A1* | 5/2018 | Bowers | G06Q 10/0635 |
| 2018/0336404 A1 | 11/2018 | Hosabettu et al. | |
| 2019/0073528 A1* | 3/2019 | Agarwalla | G06K 9/6256 |
| 2019/0138509 A1 | 5/2019 | von Rickenbach et al. | |
| 2019/0197483 A1 | 6/2019 | Li et al. | |
| 2020/0034611 A1 | 1/2020 | Hosabettu et al. | |
| 2020/0272788 A1* | 8/2020 | Sanderson | G06K 9/00469 |
| 2020/0311571 A1* | 10/2020 | Bellert | G06N 5/04 |

OTHER PUBLICATIONS

"Notice of Allowance", U.S. Appl. No. 16/664,335, dated Dec. 11, 2020, 5 pages.

* cited by examiner

HEADING IDENTIFICATION AND CLASSIFICATION FOR A DIGITAL DOCUMENT

BACKGROUND

Document analytics systems are implemented to analyze digital documents and determine attributes of digital documents that are not practically determined, solely, by human users. Document attributes such as structural features, for example, may not be identified in the document itself due to limitations of the document format, and/or because a document author did not identify the attributes at the point of document creation. For instance, consider documents such as Portable Document Format (PDF) documents. A typical document analytics system can perform an optical scan of a PDF document to produce a digitized version of the image-based digital document. Such digitized versions, however, do not typically label higher-order document structures, such as headings and other structural features.

Further, other document types (e.g., Word documents) may not explicitly label hierarchical structural features. For instance, a document creator may utilize character formatting (e.g., tab adjustment, font size, bolding, and so forth) to create an implied document structure without actually labeling different structural features. Accordingly, since conventional document analytics systems are unable to categorize such higher-order features from digital documents, this prevents such systems from generating condensed representations of the semantic structures of image-based documents, such as an outline view of an image-based document that enables simple and automated navigation between different portions of the document.

Thus, conventional document analytics systems are unable to accurately recognize and categorize higher-order features from digital documents. Further, due to the sheer volume of content in digital documents and collections of digital documents, user-implemented manual categorization of such features of digital documents is infeasible and prone to user-introduced error.

SUMMARY

Techniques described herein implement heading identification and classification for a digital document in a digital medium environment. A document analysis system is leveraged to extract structural features from a digital document, identify headings from among the structural features, and classify the headings into different headings types. The classified headings are then utilized to generate a sectioned version of the digital document (a "sectioned document") that is divided into different sections based on the headings. Further, a document directory is generated that includes the headings and that enables navigation through hierarchical portions of the sectioned document.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
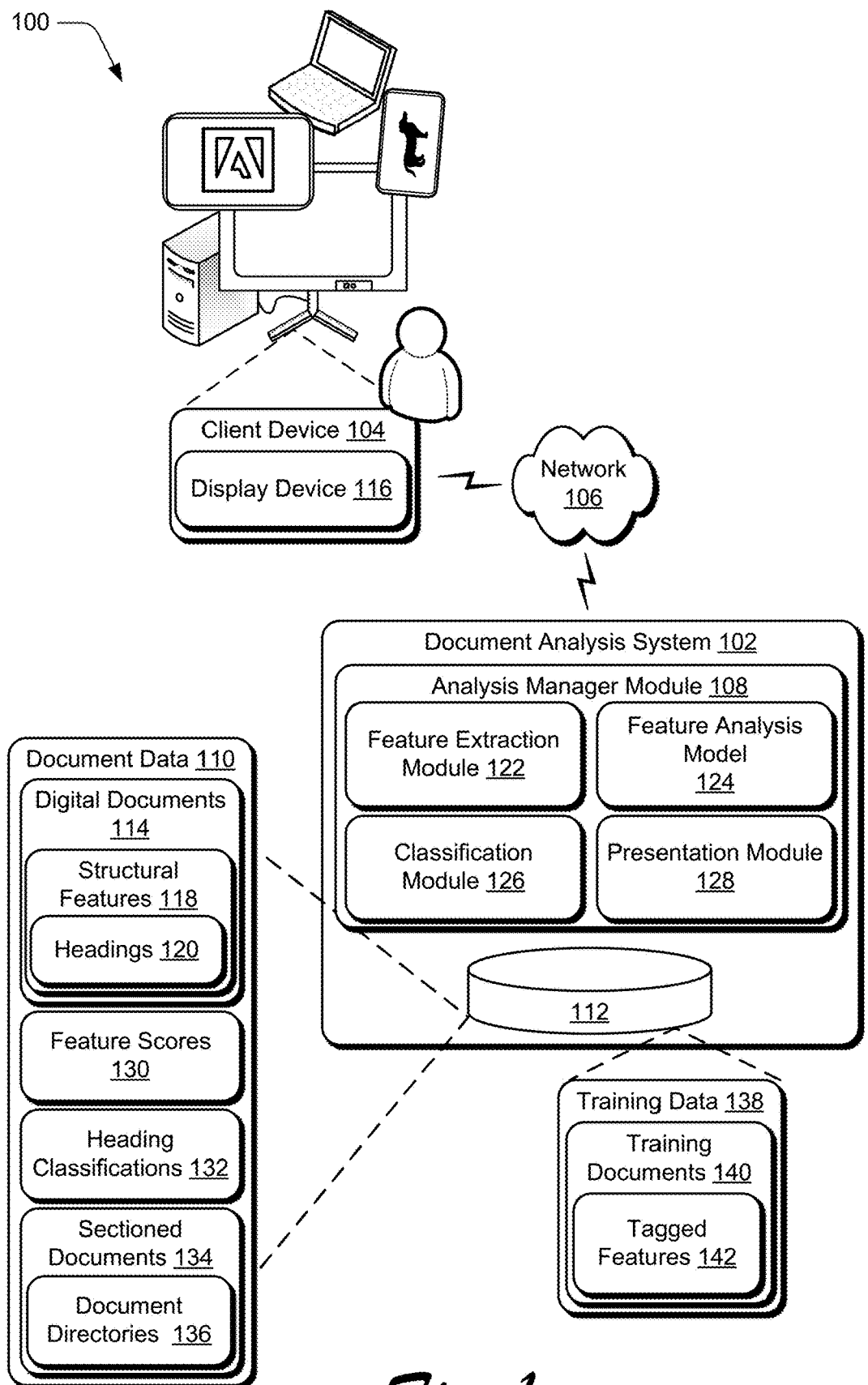
FIG. 1 is an illustration of an environment in an example implementation that is operable to employ techniques described herein.

To overcome the challenges to document feature classification presented in typical document analytics systems, heading identification and classification for a digital document is leveraged in a digital medium environment. For instance, a document analysis system receives a digital document for processing, such as a render-based digital document. Generally, the digital document includes various types of structural features, such as text blocks, images, headings, lists, tables, end/footnotes, headers, footers, and so forth. A feature extraction module extracts the structural features from the digital document to obtain the unclassified structural features, such as via an optical scan or other computer vision technique. As part of extracting the structural features, the feature extraction module determines position information that describes a position of each of the structural features in the digital document, as well as different visual attributes of the structural features.

The document analysis system then utilizes the extracted structural features to perform a feature analysis to ascertain a likelihood that each structural feature represents a heading of the digital document. To do this, the structural features are input to a feature analysis model, which processes each structural feature and outputs a feature score representing a probability that each structural feature represents a heading. For instance, the higher a feature score, the more likely that a particular structural feature represents an instance of a heading.

A classification module then takes the structural features and sorts the structural features based on their visual attributes and their respective feature scores. For instance, those structural features with feature scores that exceed a likelihood threshold are sorted into different feature buckets based on common visual attributes such as font, font size, page alignment, enumeration label, and so forth. The feature buckets are then augmented with other structural features that share common visual attributes with the feature buckets, but that exhibit feature scores that are below the likelihood threshold. Feature scores for structural features in each of the augmented feature buckets are averaged, and those augmented feature buckets with average feature scores that exceed a threshold average likelihood score are designated as headings, e.g., heading buckets that each include different sets of structural features that designated as headings.

The headings from the heading buckets are then processed to assign to headings to different heading types, such as primary headings, subheadings, special headings, and so forth. For instance, the content weight of each of the headings is compared and used to assign each heading as a heading type. Generally, and as detailed below, "content weight" refers to a way of quantifying visual attributes of headings to enable the headings to be assigned as a correct heading type.

In at least one implementation, the heading identification and classification may result in an enumerated heading being omitted or out of order. Generally, "enumeration" refers to various conventions for visually labeling structural features to indicate a particular order of the structural features within a digital document, such as numbering, lettering, and combinations thereof. Accordingly, an enumeration check process can be performed that analyzes the identified headings in order of their appearance from the original digital document, and ascertains whether an enumerated heading is missing. If a missing enumeration is detected, the headings from the different heading buckets are searched to determine whether a heading that matches the missing enumeration can be found. When a matching heading is located, the matching heading is used to replace the missing enumerated heading to maintain the heading enumeration order of the headings extracted and identified from the digital document.

Further to the techniques described herein, the headings are then utilized to generate a sectioned version of the original digital document (a "sectioned document") that is subdivided based on the headings. For instance, the headings are designated as navigation points throughout the sectioned document. Further, a document directory is generated utilizing the headings that presents a visual and logical overview of the sectioned document. The document directory, for example, is presented at the beginning of the sectioned document, and the sectioned document is navigable via interaction with the headings presented in the document directory.

Accordingly, techniques for heading identification and classification for a digital document overcome the deficiencies of traditional ways for digital document analysis. For instance, the innovative techniques accurately identify and classify headings of digital documents without requiring user intervention to specify or validate the identified headings. Based on the classified headings, sectioned versions of digital documents can be generated that utilize the identified headings as navigation points for quick and efficient document navigation. Further, document directories can be generated utilizing the headings to enable a user to interact with the document directories to rapidly navigate to different sections of a sectioned document. The headings and document directories, for instance, enable semantic navigation of a document, as contrasted with typical topological document navigation. In this way, accurate classification of headings of digital documents can be leveraged to reduce inaccuracies and resource wastage experienced in conventional document analysis systems.

Term Descriptions

These term descriptions are provided for purposes of example only and are not intended to be construed as limiting on the scope of the claims.

As used herein, the term "digital document" refers to digital collections of digital content, such as digital text and digital images. Examples of digital documents include Portable Document Format (PDF) documents, editable digital text documents, digital image documents (e.g., Tagged Image File Format (TIFF) files), and so forth. In at least some implementations, a digital document is implemented as a digital document that does not include editable text or other editable visual features. The described techniques, for instance, are applicable to such documents that have been processed via optical character recognition (OCR) to obtain text characters and other structural features.

As used herein, the term "structural feature" refers to visual elements of digital documents, such as visual structures that make up a digital document. Generally, a particular digital document can be characterized as a set of structural features that are arranged in a particular way to generate the visual appearance of the particular digital document. Examples of structural features include text blocks, headings, Tillable form fields, selectable options, lists, list items, bullets and bulleted items, and so forth. Further, as part of extracting and utilizing structural features, attributes of structural features can be obtained for further processing such as text content, images, and vector representations of the structural features.

As used herein, the term "heading" refers to a structural feature of a digital document that is utilized for visually dividing the digital document into different sections and subsections. For instance, different sections of a digital document may each be preceded by a heading that identifies the respective section. Generally, a heading can include different types of content, such as a short text description of a subsequent section. Further, headings can be enumerated to indicate their relative order in a set of headings.

As used herein, the term "enumeration" refers to various conventions for visually labeling headings to indicate a particular order of the headings within a digital document. Enumeration, for instance, can utilize numbering, lettering, or other characters, and combinations thereof to indicate a relative order and hierarchy of headings in a digital document.

As used herein, the term "classifying" refers to a computer-executed function (e.g., a computer-executed process and/or action) of assigning and/or categorizing a heading of a digital document based on its visual attributes and/or heading type. For instance, headings that are identified utilizing techniques described herein can be classified based on their visual attributes and placed into groups based on common visual attributes. Further, visual attributes of headings can be utilized to identify heading types of headings, such as primary headings, subheadings, special headings, and so forth.

In the following discussion, an example environment is first described that may employ the techniques described herein. Example systems, implementations, and procedures are then described which may be performed in the example environment as well as other environments. Performance of the example procedures is not limited to the example environment and the example environment is not limited to performance of the example procedures. Finally, an example system and device are described that are representative of one or more computing systems and/or devices that may implement the various techniques described herein.

Example Environment

FIG. 1 is an illustration of an environment 100 in an example implementation that is operable to employ heading identification and classification for a digital document as described herein. The illustrated environment 100 includes a document analysis system 102 and a client device 104 that are communicatively coupled, one to another, via a network 106.

Computing devices that are usable to implement the document analysis system 102 and the client device 104 may be configured in a variety of ways, such as a desktop computer, a laptop computer, a mobile device (e.g., assuming a handheld configuration such as a tablet or mobile phone), and so forth. Further, such devices may be representative of a plurality of different devices, such as multiple servers utilized by an enterprise to perform operations "over the cloud" as further described in relation to FIG. 12.

The document analysis system 102 includes an analysis manager module 108 that is representative of functionality to analyze and categorize structural features of digital documents further to techniques for heading identification and classification for a digital document described herein. As part of enabling the analysis manager module 108 to perform such analyses and categorization, the document analysis system 102 maintains document data 110 on a data storage 112. The document data 110 includes digital documents 114, which represent different instances of electronic digital content that can be output in various ways and in various forms, such as via display on a display device 116 of the client device 104. Examples of the digital documents 114 include digital forms, digital publications, digital text documents, web content (e.g., web pages), and so forth. In at least some implementations, the digital documents 114 include image-based digital documents, such as PDF documents. An image-based digital document, for example, represents a digital document with content encoded as images, in contrast with other types of digital documents that may include machine-encoded text and other types of machine-encoded content.

The digital documents 114 include structural features 118, with some of the structural features 118 representing headings 120. The structural features 118 represent visual elements of digital documents 114, such as visual structures that make up a digital document 114. For instance, a particular digital document 114 can be characterized as a set of structural features 118 that are arranged to generate the visual appearance of the particular digital document 114. The headings 120 represent instances of the structural features 118 that are utilized to divide the digital documents 114 into different sections. In at least some implementations, the headings 120 are hierarchical and include document titles, primary headings, subheadings, and so forth. Further, the headings 120 can include different types of digital content, such as text, numbers, symbols (e.g., bullets), and so forth. In addition to the headings 120, the structural features 118 may include other features such as text blocks, form fields, digital images, headers, footers, and so on.

Further to techniques for heading identification and classification for a digital document, the analysis manager module 108 includes a feature extraction module 122, a feature analysis model 124, a classification module 126, and a presentation module 128. The feature extraction module 122 is representative of functionality to analyze and extract different features of the digital documents 114, such as the structural features 118. In at least one implementation, the feature extraction module 122 utilizes computer vision processes to analyze and extract the structural features 118 from the digital documents 114. The feature analysis model 124 represents a machine learning model (or set of models) that takes the structural features 118 as input, and generates feature scores 130 that represent confidence values that quantify a likelihood that each of the structural features 118 represents an instance of a heading 120. In at least one implementation, for example, the higher the feature score 130 for a particular structural feature 118, the more likely the structural feature 118 represents a heading 120.

The classification module 126 represents functionality for processing the structural features 118 based on their features scores 130 to determine whether the classify instances of the structural features 118 as headings 120. Further, the classification module 126 processes the headings 120 based on their visual appearance to generate heading classifications 132 for the headings 120. Generally, the heading classifications 132 groups the headings 120 into different types of headings, such as primary headings, subheadings, special headings (e.g., title headings), and so forth.

The presentation module 128 represents functionality for generating and outputting sectioned documents 134 and document directories 136 based on the headings 120 and the heading classifications 132. Generally, the sectioned documents 134 represent sectioned versions of the digital documents 114 that are sectioned based on the identified headings 120. For instance, the presentation module 128 utilizes headings 120 identified for a particular digital document 114 to divide the digital document into different sections to generate a corresponding sectioned document 134.

Further, the document directories 136 represent condensed representations of the sectioned documents 134 and can be used to enable quick and efficient navigation of the sectioned documents 134. The document directories 136 can be implemented in various ways, such as in the form of a table of contents, a document outline, a document summary, and so forth. The document directories 136 can be provided to the client device 104 along with corresponding sectioned documents 134 for display and user interaction via the display device 116.

To enable the feature analysis model 124 to generate the heading classifications 132, the document analysis system 102 maintains training data 138 stored on the storage 112. Generally, the training data 138 can be utilized by the analysis manager module 108 to train the feature analysis model 124 prior to processing the structural features 118. The training data 138, for instance, includes training digital documents ("training documents") 140, which include tagged structural features ("tagged features") 142. The tagged features 142, for instance, are generated by processing (e.g., manually) digital documents and applying tags to the tagged features 142 that identify which category each tagged feature 142 belongs to. The tagged features 142, for instance, indicate whether individual features of the training documents 140 are headings, e.g., that a particular structural feature is a heading or is not a heading. For those structural features of the training documents 140 categorized as headings, the tagged features 142 further indicate what type of heading they are, e.g., primary, secondary (e.g., a subheading), tertiary (e.g., a sub-subheading), a special heading, and so forth. The tagged features 142 can then be used to train the feature analysis model 124 to categorize the structural features 118 of the digital documents 118.

According to implementations for heading identification and classification for a digital document, the analysis manager module 108 can configure the feature analysis model 124 using any type of machine-learning technique to enable classification of structural feature categories as described herein. Further, such a machine-learning model uses one or more of supervised learning, unsupervised learning, or reinforcement learning. For example, the machine-learning model can include, but is not limited to, decision trees, support vector machines, linear regression, logistic regression, Bayesian networks, random forest learning, dimensionality reduction algorithms, boosting algorithms, artificial neural networks (e.g., fully-connected neural networks, convolutional neural networks, or recurrent neural networks), deep learning, or combinations thereof.

Having considered an example environment, consider now a discussion of some example details of the techniques for heading identification and classification for a digital document in a digital medium environment in accordance with one or more implementations.

Implementation Scenarios

Figure 2:
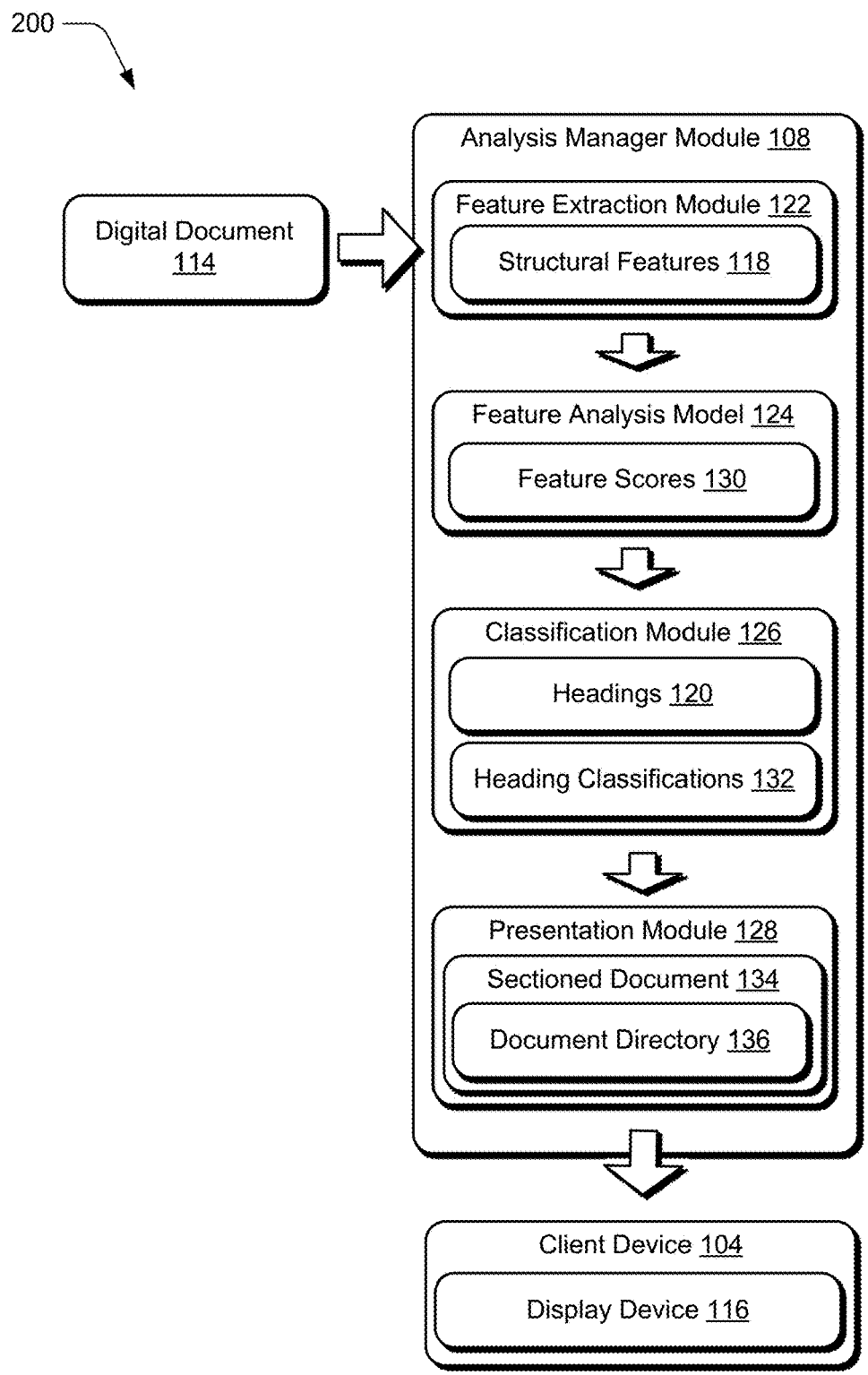
FIG. 2 depicts an example system that represents an overview of processes for heading identification and classification for a digital document.

FIG. 2 depicts an example system 200 that represents an overview of processes for heading identification and classification for a digital document in accordance with various implementations. In the system 200, the analysis manager module 108 receives a digital document 114, and the feature extraction module 122 processes the digital document 114 to extract structural features 118 from the digital document 114. As referenced above, the feature extraction module 122 can utilize computer vision techniques to analyze visual aspects of the digital document 114 and extract the structural features 118. Generally, the feature extraction module 122 extracts various attributes of the structural features 118, such as such as text content, images, and vector representations of the structural features 118. Thus, the various processing described herein can utilize these attributes of the structural features 118, such as for determining feature scores for individual structural features.

The feature analysis model 124 then takes the structural features 118 as input and generates feature scores 130 for each of the structural features 118. Generally, each feature score 130 indicates a likelihood that a respective structural feature 118 represents a heading. The feature scores 130, for instance, identify each of the individual structural features 118, and a respective score for each structural feature 118. In at least one implementation, the feature scores are based on a scale of 0→1, with 0 indicating a very low likelihood that a particular structural feature represents a heading, and a score of 1 indicating a very high likelihood that a respective structural feature represents a heading.

The classification module 126 takes the feature scores 130 and the structural features 118 as input, and processes them to identify the headings 120 and to generate the heading classifications 132 for the structural features 118. For instance, and as further detailed below, the classification module 126 sorts the structural features 118 into different buckets based on their respective feature scores 130, and then processes the buckets to determine whether each bucket represents a heading, a subheading, or other structural feature.

Utilizing the heading classifications 132, the presentation module 128 generates a sectioned document 134 that represents the digital document 114 divided into different sections based on the headings 120. The presentation module 128 also generates a document directory 136 that presents a logical and visual overview of the sectioned document 134 utilizing the headings 120. The presentation module 128 causes the sectioned document 134 to be available for output by the client device 104, such as for display by the display device 116.

Figure 3:
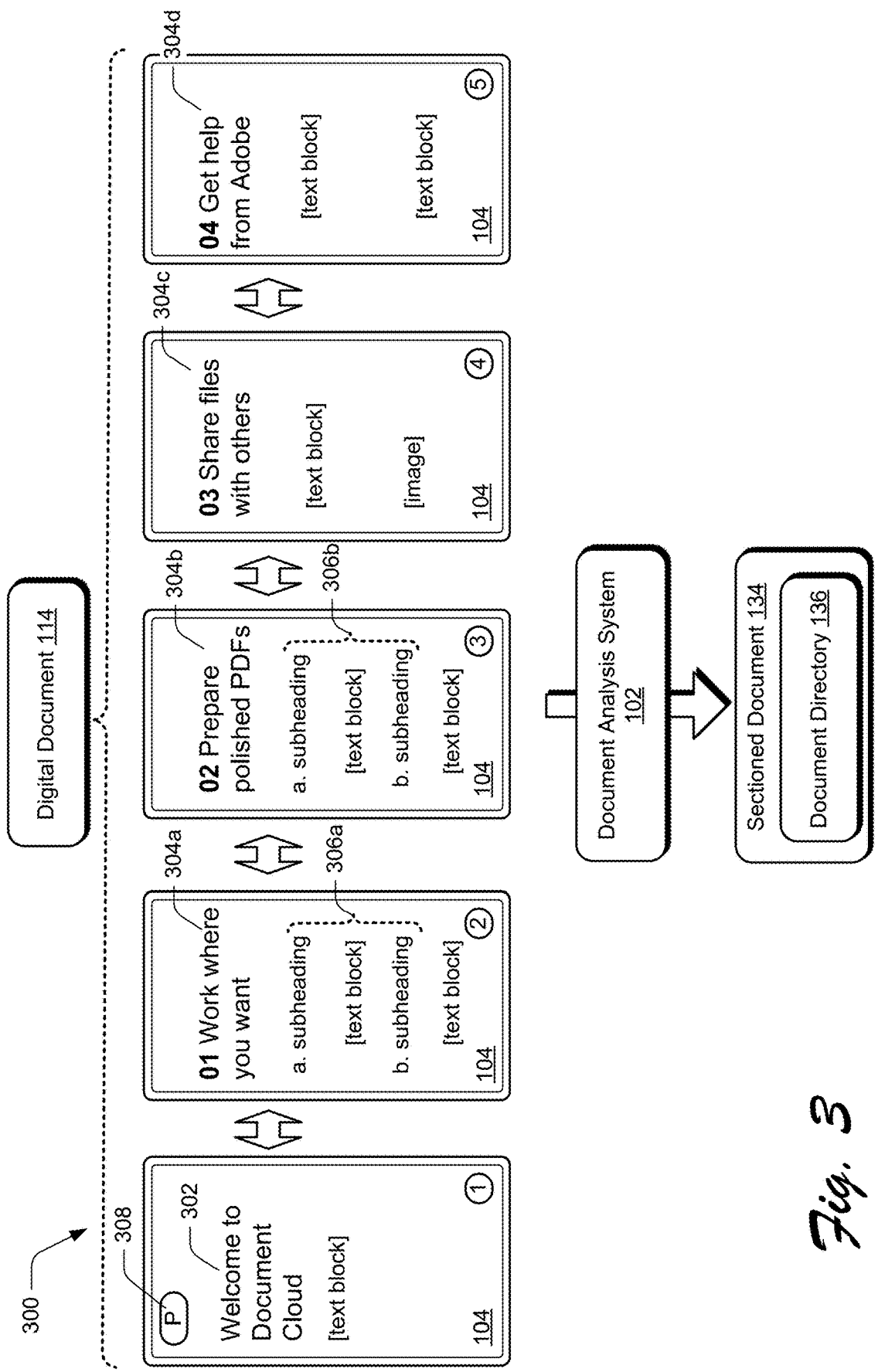
FIG. 3 depicts an implementation scenario for generating a sectioned document based on a digital document.

FIGS. 3-6 depict example aspects of an implementation scenario for heading identification and classification for a digital document. For instance, FIG. 3 depicts an implementation scenario 300 for generating a sectioned document based on a digital document. The scenario 300 includes different pages of the digital document 114 displayed on the client device 104, as shown via the different page numbers "1-5." Further, pages of the digital document 114 include different structural features, including a title heading 302, primary headings 304a-304d, and subheadings 306a, 306b included for the primary headings 304a, 304b, respectively. In at least one implementation, the digital document 114 initially represents an image-based document that does not include machine-encoded text, e.g., no ASCII characters. Generally, a user can navigate through the different pages of the digital document 114, such as by scrolling the digital document using touch input to the display device 116.

Continuing with the scenario 300, the digital document 114 is input to the document analysis system 102, which processes the digital document 114 to generate the sectioned document 134 including the document directory 136. In at least one implementation, a user selects a process control 308, which causes the document analysis system 102 to generate the sectioned document 134 based on the digital document 114.

Figure 4:
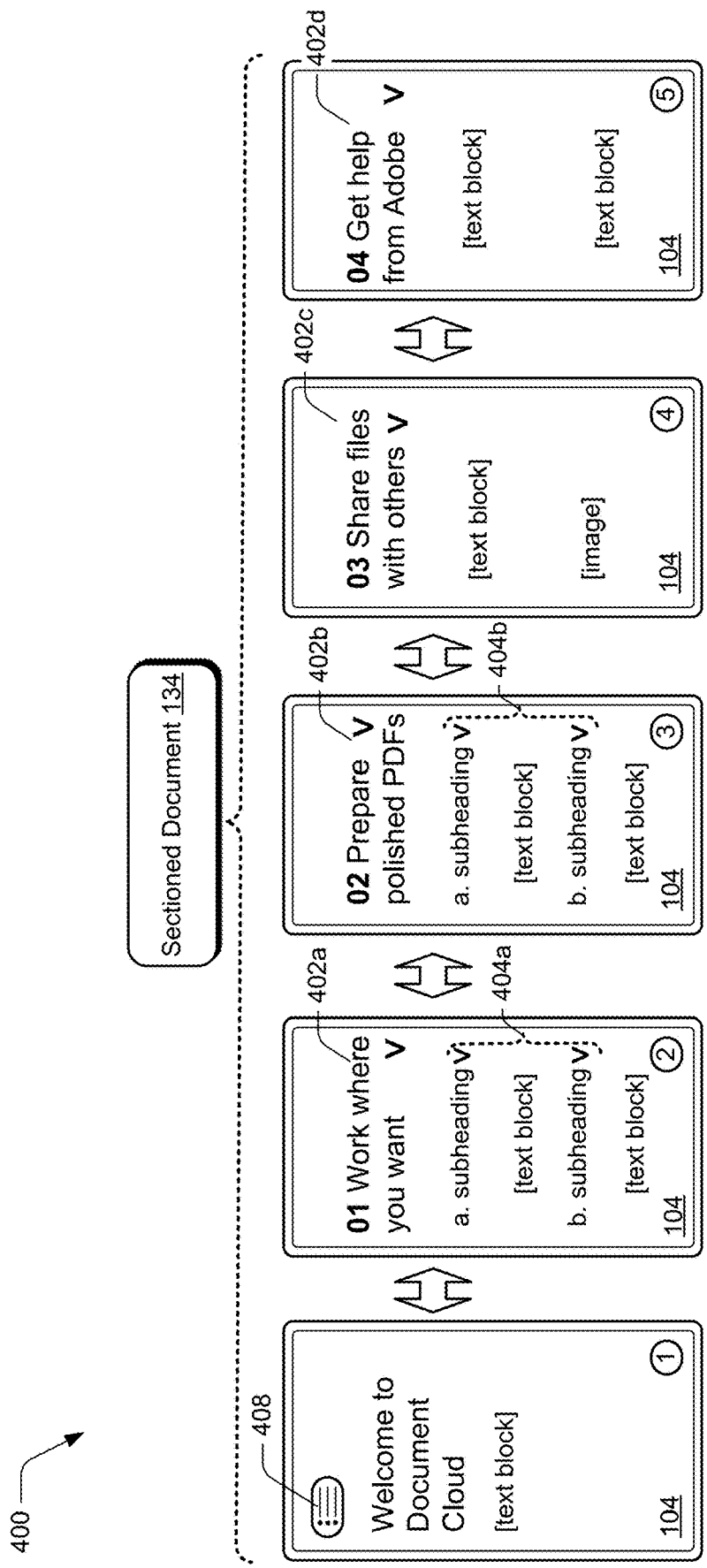
FIG. 4 depicts a scenario for displaying a sectioned document.

FIG. 4 depicts a scenario 400 for displaying the sectioned document 134. The scenario 400, for instance, represents a continuation of the scenario 300. In the scenario 400, different pages 1-5 of the sectioned document 134 are displayed on the display device 116. Generally, the pages of the sectioned document 134 include the same corresponding content from the respective pages of the original digital document 114. The headings of the digital document 114, however, have been transformed into active headings of the sectioned document 134. For instance, the primary headings 304a-304d are transformed into active headings 402a-402d, respectively. Further, the subheadings 306a, 306b are transformed into active subheadings 404a, 404b. Generally, an "active heading" and an "active subheading" represent headings that are configured to receive user interaction for affecting visual output of the sectioned document 134. For instance, active headings 402a-402d and the active subheadings 404a, 404b each include a collapse control 406 that is selectable to collapse the content of a respective page of the sectioned document 134 relative to a heading of the page. A directory control 408 is also presented that is selectable to cause a document directory for the sectioned document 134 to be displayed.

Figure 5:
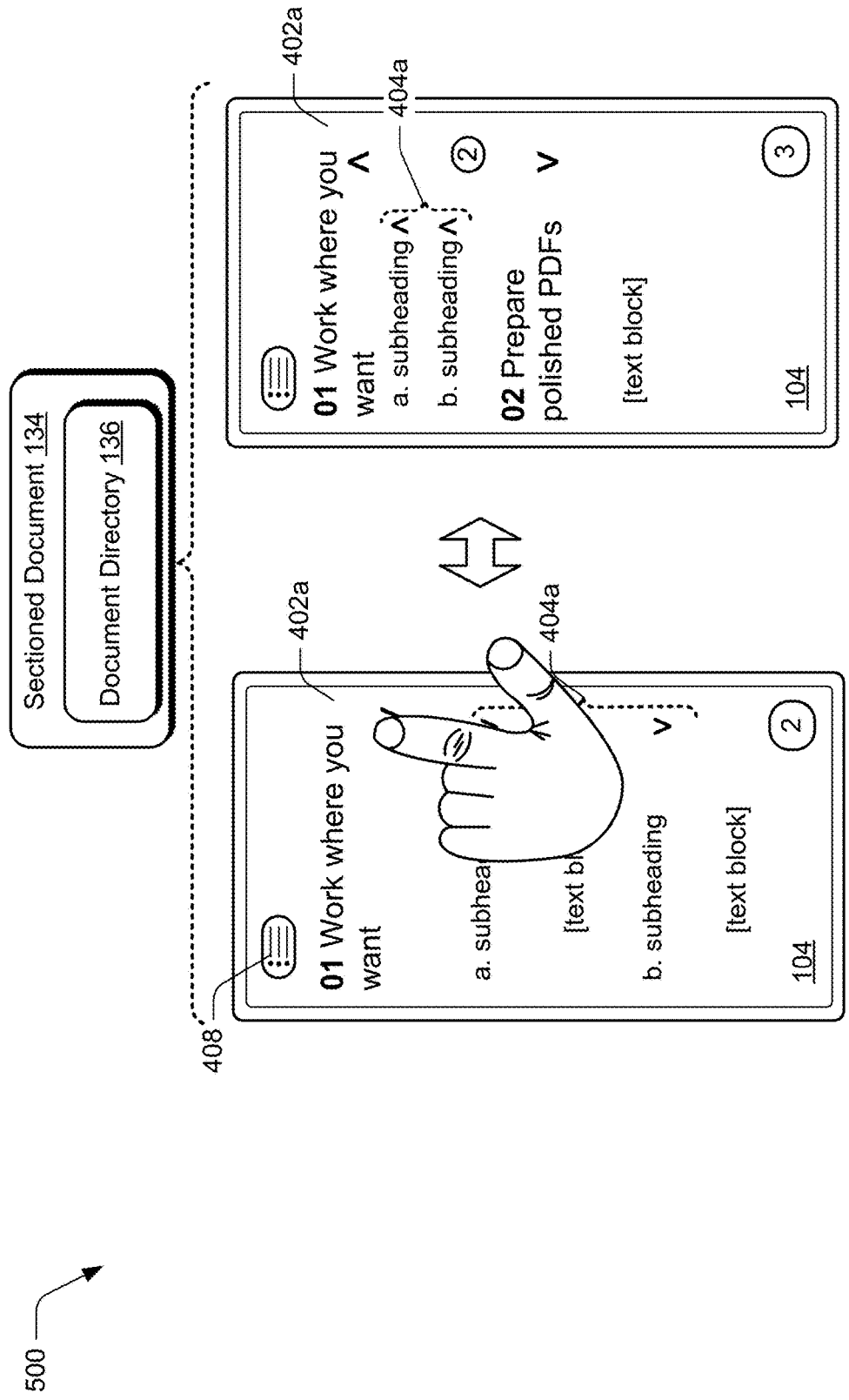
FIG. 5 depicts a scenario for collapsing a heading of a sectioned document.

FIG. 5 depicts a scenario 500 for collapsing a heading of the sectioned document 134. The scenario 500, for instance, represents a continuation of the scenarios 300, 400. In the scenario 500, a user selects the collapse control 406 for the primary heading 402a of page 2 of the sectioned document 134. Accordingly, the content for page 2 of the sectioned document 134 is collapsed about the primary heading 402a. For instance, text content from the body portion of page 2 is removed from display and page 2 is collapsed by displaying the subheadings 404a for page 2 beneath the primary heading 402a. In at least one implementation, collapsing page 2 causes subsequent pages of the sectioned document 134 to be repositioned adjacent the collapsed page 2. For instance, as depicted in the scenario 500, page 3 of the sectioned document 134 is presented in an uncollapsed form immediately following the collapsed page 2. Alternatively, selecting a collapse control 406 for a particular page causes all pages of the sectioned document 134 to be collapsed similarly to page 2.

In the collapsed page 2, expand controls 502 are presented adjacent the primary heading 402a and the subheadings 404a that are selectable to expand content of page 2 about the headings. For instance, selecting an expand control 502 adjacent the primary heading 402a causes page 2 of the sectioned document 134 to be expanded, such as by displaying content associated with the subheadings 404a. Further, selecting an expand control 502 adjacent a subheading 404a causes content associated with the subheading 404a to be presented. For instance, selecting an expand control 502 for the first subheading 404a causes content associated with the first subheading 404a to be presented, but not content associated with the second subheading 404a.

Figure 6:
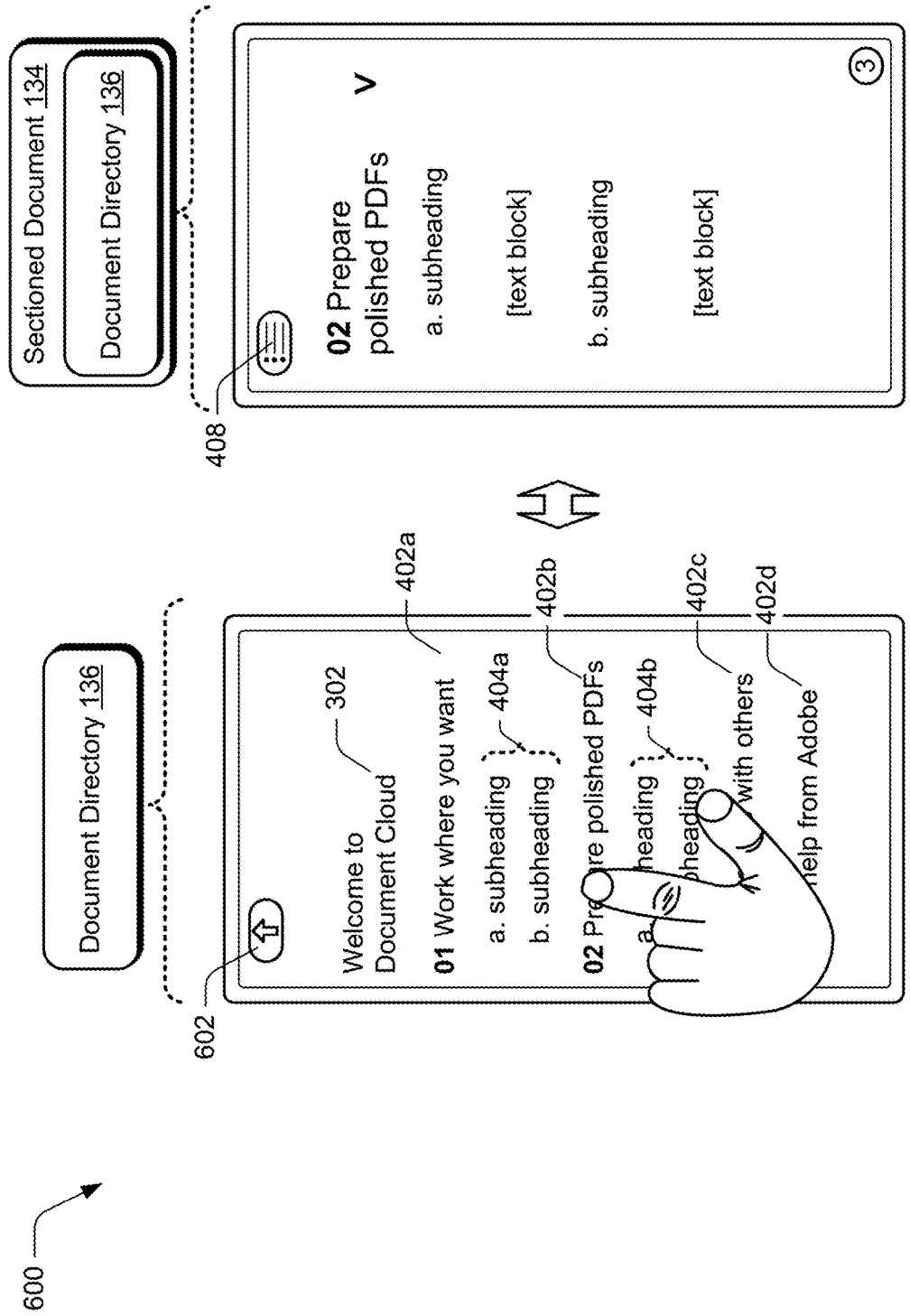
FIG. 6 depicts a scenario for displaying a document directory of a sectioned document.

FIG. 6 depicts a scenario 600 for displaying the document directory 136 of the sectioned document 134. The scenario 600, for instance, represents a continuation of the scenarios 300-500. In the scenario 600, a user selects the directory control 408, which causes the document directory 136 to be displayed on the display device 116. Generally, the document directory 136 includes the title heading 302 and the different active headings 402a-402d and active subheadings 404a, 404b without the body content of the different pages of the sectioned document 134. The document directory 136, for instance, represents a condensed version of the sectioned document 134 that preserves the logical and visual structure of the different headings while removing body content.

According to various implementations, the active headings 402a-402d and active subheadings 404a, 404b are interactive to enable navigation throughout the sectioned document 134 via interaction with the document directory 136. For instance, selecting a particular active heading/active subheading within the document directory 136 causes a navigation to a page of the sectioned document 134 associated with the active heading/active subheading. Alternatively or additionally, selecting a particular active heading/active subheading will cause the selected heading to be expanded to include content associated with the heading. For instance, the document directory 136 can be presented as a separate page of the sectioned document 134 that can receive user interaction for navigating to the different pages of the sectioned document 134.

As an example, in the scenario 600, a user provides input to select the active heading 402b from the document directory 136. In response, page 3 of the sectioned document 134 is presented populated with the various body content of the page. For instance, the presentation module 128 navigates to page 3 of the section document 1134 and the active heading 402b and its active subheadings 404b are presented including their various associated content from the original digital document 114.

The document directory 136 also includes a global expand control 602, which is selectable to cause the entire document directory 136 to be expanded about the active headings and active subheadings such that the full pages of the sectioned document 134 are displayed, such as depicted in the scenario 400.

Accordingly, these example scenario illustrate that techniques for heading identification and classification for a digital document can be employed to process a digital document to generate logical sections including various types and instances of headings and to thus enable various navigable representations of the digital document to be generated.

Figure 7:
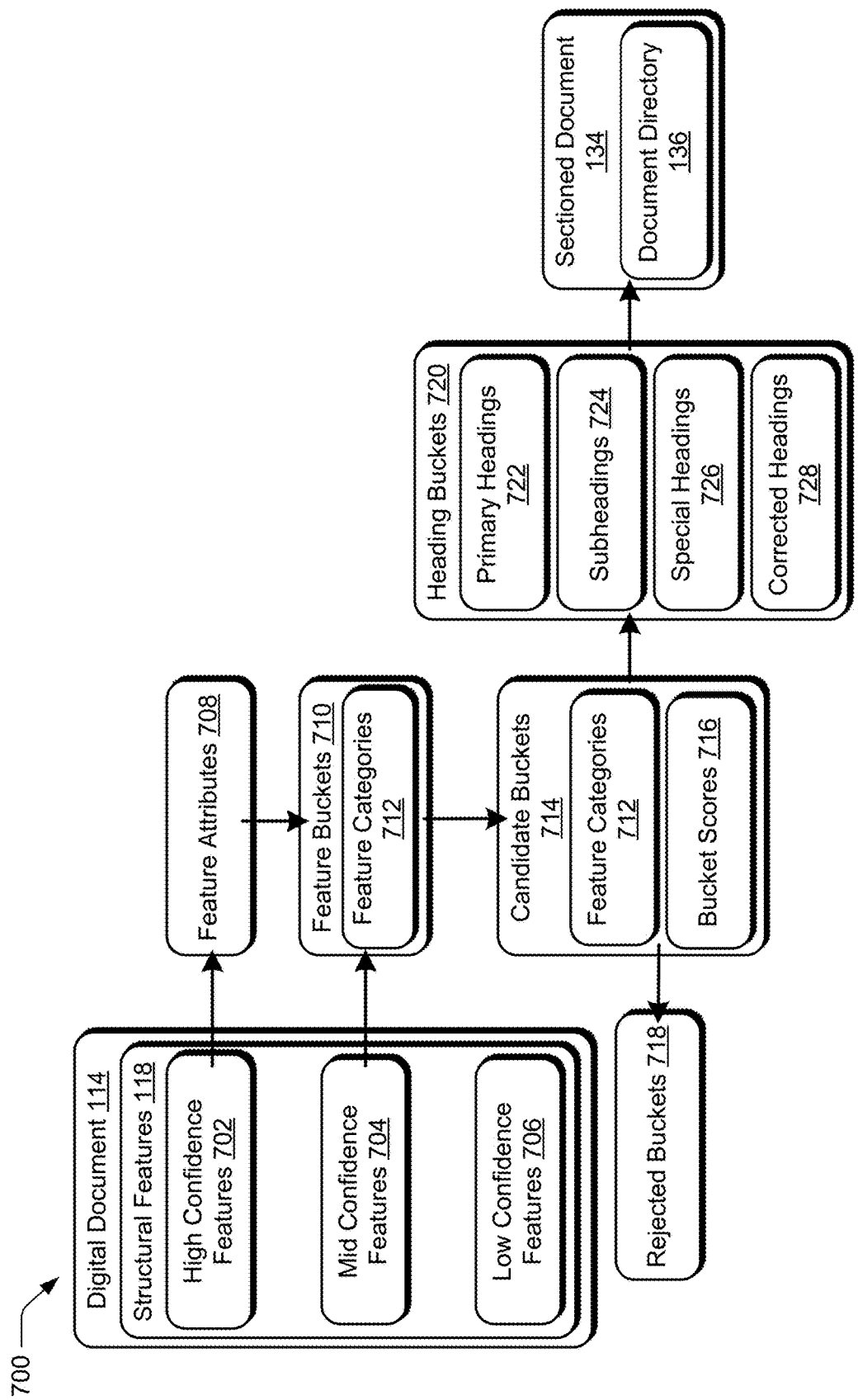
FIG. 7 depicts a system for generating a sectioned version of a digital document.

FIG. 7 depicts a system 700 for generating a sectioned version of a digital document. In the system 700, the digital document 114 is processed to identify the structural features 118, such as described above. The structural features 118 are then analyzed to generate feature scores for each of the features, and the structural features 118 are sorted into high confidence features 702, mid confidence features 704, and low confidence features 706 based on their respective feature scores. The different feature scores, for instance, can be based on different confidence thresholds. For example, the high confidence features 702 represent structural features 118 with a feature score greater than 0.8, the mid confidence features 704 represent structural features with a feature score between 0.3 and 0.8, and the low confidence features 706 represent structural features 118 with a feature score of 0.3 or lower. These particular thresholds are provided for purpose of example only, and it is to be appreciated that a variety of different thresholds and threshold values may be utilized in accordance with the implementations described herein.

After the structural features 118 are sorted as described, the high confidence features 702 are then sorted based on feature attributes 708 into different feature buckets 710 that each represent different feature categories 712. Generally, the feature attributes 708 represent different visual attributes of the structural features 118, examples of which include:

Font (e.g., font name and/or font size)

Character styling such as bolded, underline, italics, serifed, capitalized, and combinations thereof Character alignment on a page (e.g., character position relative to borders of a page)

Enumeration labels applied to features, e.g.: "A."; "a."; "1."; "A.1."; and so on Accordingly, each feature bucket 710 represents a set of high confidence features 702 that share a common set of feature attributes 708 that define a respective feature category 712. That is, each feature category 712 defines a different distinct set of feature attributes 708. In at least one implementation, feature scores for the structural features are generated on a page-wise basis for the digital document 114, and the high confidence features 702 are sorted into the feature buckets 710 utilizing the structural features 118 for the entire digital document 114, e.g., on a document-wise basis. Further, high confidence features 702 that are identified as "asides" or text boxes may be excluded from the feature buckets 710.

Continuing, bucket augmentation is then performed by identifying those mid confidence features 704 that match different feature categories 712, e.g., that have visual attributes that match respective feature categories 712. The classification module 126, for instance, analyzes the mid confidence features 704 utilizing the feature attributes 708 for the different feature categories 712 to identify mid confidence features 704 that match a particular feature category 712. In at least one implementation, this is done to capture mid confidence features 704 that match respective high confidence features 702, but that have lower feature scores such that they are not initially grouped with the high confidence features 702.

Accordingly, the high confidence features 702 from the feature buckets 710 and the matching mid confidence features 704 are grouped into candidate buckets 714 that each match a particular feature category 712. Bucket scores 716 are then calculated for the candidate buckets 714 by averaging the feature scores for all of the structural features 118 in each of the candidate buckets 714. For instance, each bucket score 716 represents an average feature score of all of the high confidence features 702 and mid confidence features 704 in a respective candidate bucket 714. A bucket rejection process is then performed that rejects those candidate buckets 714 with a bucket score 716 below a particular threshold, such as 0.4. Candidate buckets 714 that are rejected are represented as rejected buckets 718, and those candidate buckets 714 that remain (e.g., that have a bucket score at or above the threshold score) are depicted as heading buckets 720.

Generally, the rejected buckets 718 may occur for various reasons, such as when particular structural features 118 initially appear to be headings, but actually represent other non-heading structural features 118. For instance, features such table captions, notes written in bold, single line headers/footers, sub-titles, and so forth, may initially appear to be headings. Such features may initially be given a high feature score because of their placement and visual resemblance to headings. However, there are enough instances of such features which have same attributes but have low feature scores such that when populated to the candidate buckets 714, such candidate buckets 714 have a low average feature score and are thus rejected with the rejected buckets 718.

The system 700 then sorts the heading buckets 720 by classifying structural features in the heading buckets 720 into different heading types including primary headings 722, subheadings 724, and special headings 726. In at least one implementation, the structural features in the heading buckets are classified and sorted by comparing their features identified in the respective feature categories 712. Generally, the primary headings 722 represent the primary division points of the digital document 114. For instance, in a hierarchical representation of the headings 120 of the digital document 114, the primary headings 722 represent the uppermost portion of the hierarchy. The subheadings 724 represent those headings that are subsidiary to the primary headings 722. Further, the special headings 726 represent headings for special portions of the digital document 114, such as headings that are detected to occur infrequently. Examples of the special headings 726 include a document title, a heading for an abstract of the digital document 114, a conclusion, a references section, and so forth. Example ways for classifying the heading buckets 720 into the different types of headings are detailed below.

As part of sorting the heading buckets 720, a heading correction process is performed to identify corrected headings 728 that represent headings that are missing and/or out of order in the primary headings 722 and/or the subheadings 724. For instance, for headings that are enumerated (e.g., 1, 2, 3 . . . ; A, B, C, . . . ; I, II, III, . . . , and so forth), the correction process ensures that there are no missing headers such that continuity in the enumerated headings is broken. This may occur due to headings being placed in the wrong heading bucket 720, and/or headings that were erroneously rejected as part of the low confidence features 706 and/or the rejected buckets 718. An example process for identifying the corrected headings 728 is detailed below.

Accordingly, based on the sorted headings in the heading buckets 720, the sectioned document 134 is generated including the document directory 136. Generally, the document directory 136 presents the primary headings 722, the subheadings 724, and the special headings 726 in their respective visual order as presented in the original digital document 114.

Having discussed example details of the techniques for heading identification and classification for a digital document, consider now some example procedures to illustrate additional aspects of the techniques.

Example Procedures

This section describes example procedures for heading identification and classification for a digital document in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the document analysis system 102 of FIG. 1 that makes use of the analysis manager module 108 and using aspects described in the scenarios above.

Figure 8:
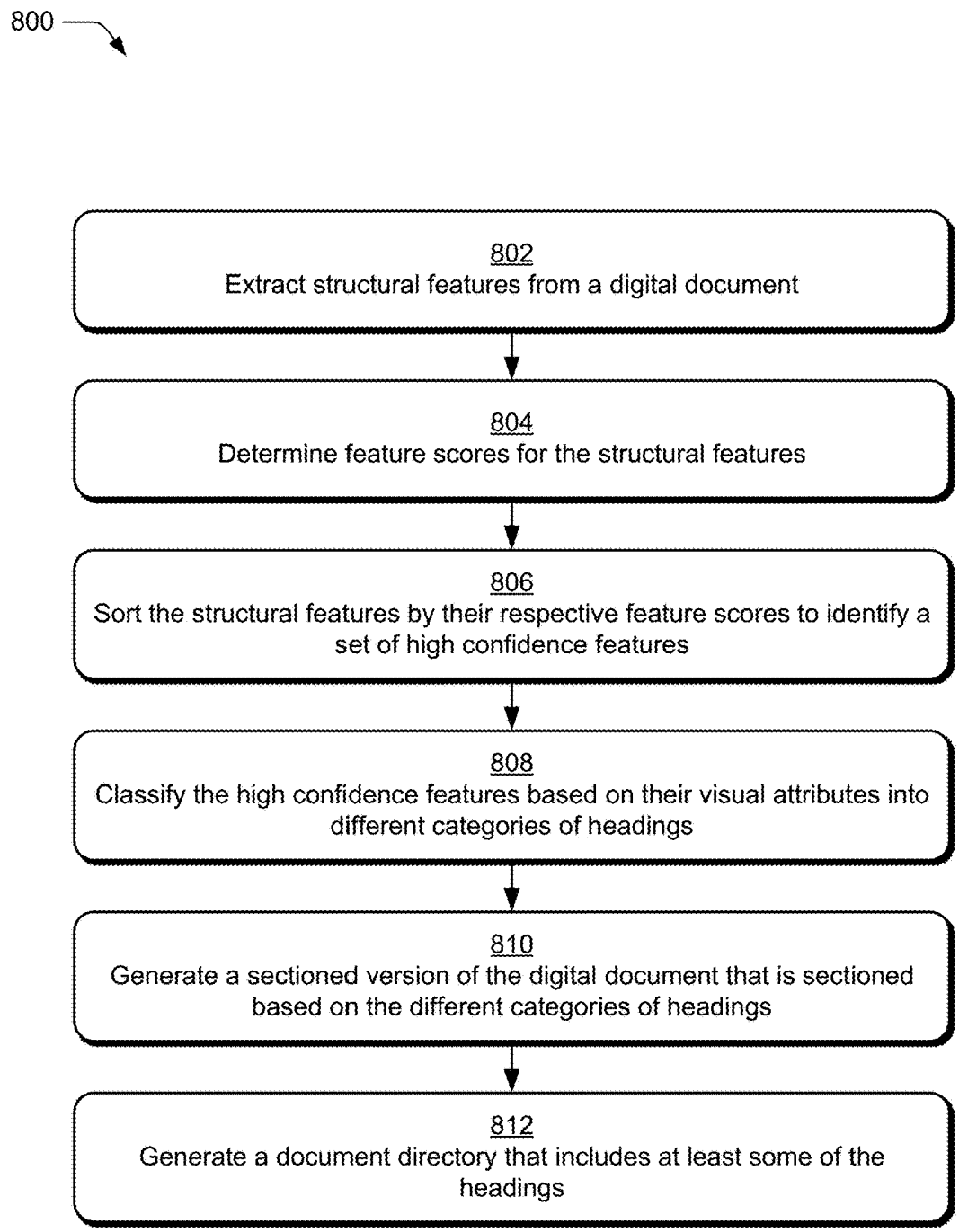
FIG. 8 depicts an example procedure for generating a sectioned version of a digital document.

FIG. 8 depicts an example procedure 800 for generating a sectioned version of a digital document. Step 802 extracts structural features from a digital document. The feature extraction module 122, for instance, utilizes computer vision techniques to analyze a digital document to differentiate different structural features of the digital document. In at least one implementation, the digital document represents a digital document (e.g., a PDF) without heading or other structural tagging information. Extracting structural features can include specifying various attributes of the structural features, such as pixel coordinates of the structural features (e.g., relative to a page of the digital document), a bounding box size for the structural features, as well as various visual attributes of the structural features, examples of which are provided above. Further, vector representations of the structural features can be generated, such as by converting the attributes of the structural features into vectors.

Step 804 determines feature scores for the structural features. Generally, each feature score indicates a likelihood that a respective structural feature represents a heading of the digital document. The analysis manager module 108, for example, leverages the feature analysis model 124 to process the extracted structural features and determine a feature score 130 for each of the features. As mentioned previously, the analysis manager module 108 utilizes the training data 138 to train the feature analysis model 124 to take structural features as input, and to generate the feature scores 130 that each represent a value indicating a relative likelihood that a respective structural feature 118 represents a heading of a digital document.

Step 806 sorts the structural features by their respective feature scores to identify a set of high confidence features that represent structural features most likely to correspond to headings of the digital document. For instance, the classification module 126 utilizes different confidence thresholds to sort the structural features based on their respective feature scores. As discussed above, this can include sorting the structural features 118 into the high confidence features 702, the mid confidence features 704, and the low confidence features 706.

Step 808 classifies the high confidence features based on their visual attributes into different categories of headings. The classification module 126, for example, analyzes the high confidence features 702 by their visual attributes and sorts the features into feature buckets 710 that each include high confidence features 702 with common visual attributes. Examples of different types of visual attributes that can be leveraged for sorting are discussed above with reference to the system 700.

Step 810 generates a sectioned version of the digital document that is sectioned based on the different categories of headings. The presentation module 128, for instance, processes the original digital document 114 to mark each heading 120 with data identifying the heading 120, such as based on heading level and/or type, e.g., primary heading, subheading, special heading, and so forth.

Step 812 generates a document directory that includes at least some of the headings. The presentation module 128, for example, also generates a document directory 136 that includes the headings 120 such that the sectioned document 134 is navigable via interaction with the document directory 136. The document directory 136, for instance, represents a condensed version of the sectioned document 134 and may be incorporated into the sectioned document 134 (e.g., prior to the body of the section document), and/or may represent a separate data representation of the sectioned document 134. In at least one implementation, if the sectioned document 134 includes multiple levels of heading hierarchy (e.g., 3 or more descending hierarchical levels), the presentation module 128 may omit some of the lower levels of the heading hierarchy from the document directory. For instance, the document directory 136 may include primary headings and sub-headings directly below the primary headings, but may exclude other subheadings that are below the first level of subheadings in the heading hierarchy. Further, the document directory 136 typically omits content (e.g., text, images, and so forth) that are not categorized as headings.

Figure 9:
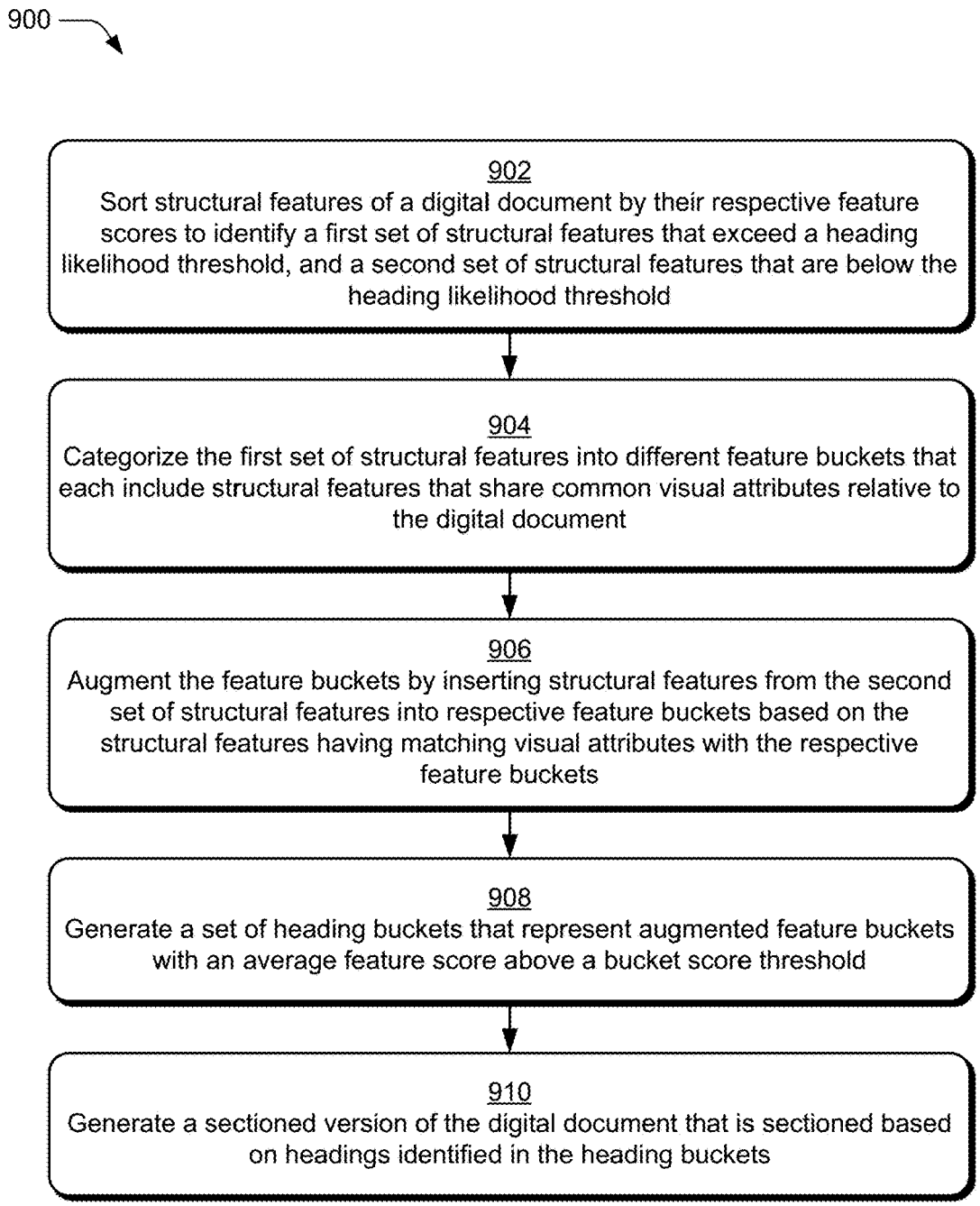
FIG. 9 depicts an example procedure for generating a sectioned version of a digital document utilizing different buckets of structural features.

FIG. 9 depicts an example procedure 900 for generating a sectioned version of a digital document utilizing different buckets of structural features. The procedure 900, for instance, is performed in conjunction with the procedure 800 for generating a sectioned version of a digital document.

Step 902 sorts structural features of a digital document by their respective feature scores to identify a first set of structural features that exceed a heading likelihood threshold, and a second set of structural features that are below the heading likelihood threshold. The classification module 126, for example, sorts a group of structural features from a digital document into the high confidence features 702, the mid confidence features 704, and the low confidence features 706 based on various confidence thresholds, examples of which are discussed above.

Step 904 categorizes the first set of structural features into different feature buckets that each include structural features that share common visual attributes relative to the digital document. For instance, the classification module 126 utilizes computer vision techniques to ascertain visual attributes of the high confidence features 702, examples of which are discussed above. The classification module 126 then sorts the high confidence features 702 that share common visual attributes into different feature buckets 710, with each feature bucket 710 representing high confidence features 702 that share common visual attributes.

Step 906 augments the feature buckets by inserting structural features from the second set of structural features into respective feature buckets based on the structural features having matching visual attributes with the respective feature buckets. The classification module 126, for example, analyzes the mid confidence features 704 to ascertain visual attributes of the features. Those mid confidence features 704 that match feature categories 712 (e.g., based on their visual attributes) for feature buckets 710 are placed into a matching feature bucket 710 to generate the candidate buckets 714.

Step 908 generates a set of heading buckets that represent augmented feature buckets with an average feature score above a bucket score threshold. For instance, the classification module 126 averages the feature scores 130 for the structural features in each candidate bucket 714, and compares the average score for each bucket to a bucket score threshold. Those candidate buckets 714 with an average score at or above the threshold are designated as heading buckets 720, and those below the threshold are discarded. As further described throughout, the heading buckets 720 can be sorted into different heading types, such as primary headings, subheadings, special headings, and so forth.

Step 910 generates a sectioned version of the digital document that is sectioned based on headings identified in the heading buckets. The presentation module 128, for example, utilizes structural features identified in the heading buckets 720 for designating headings of the original digital document, and for generating a sectioned version of the digital document and a document directory for the sectioned document.

Figure 10:
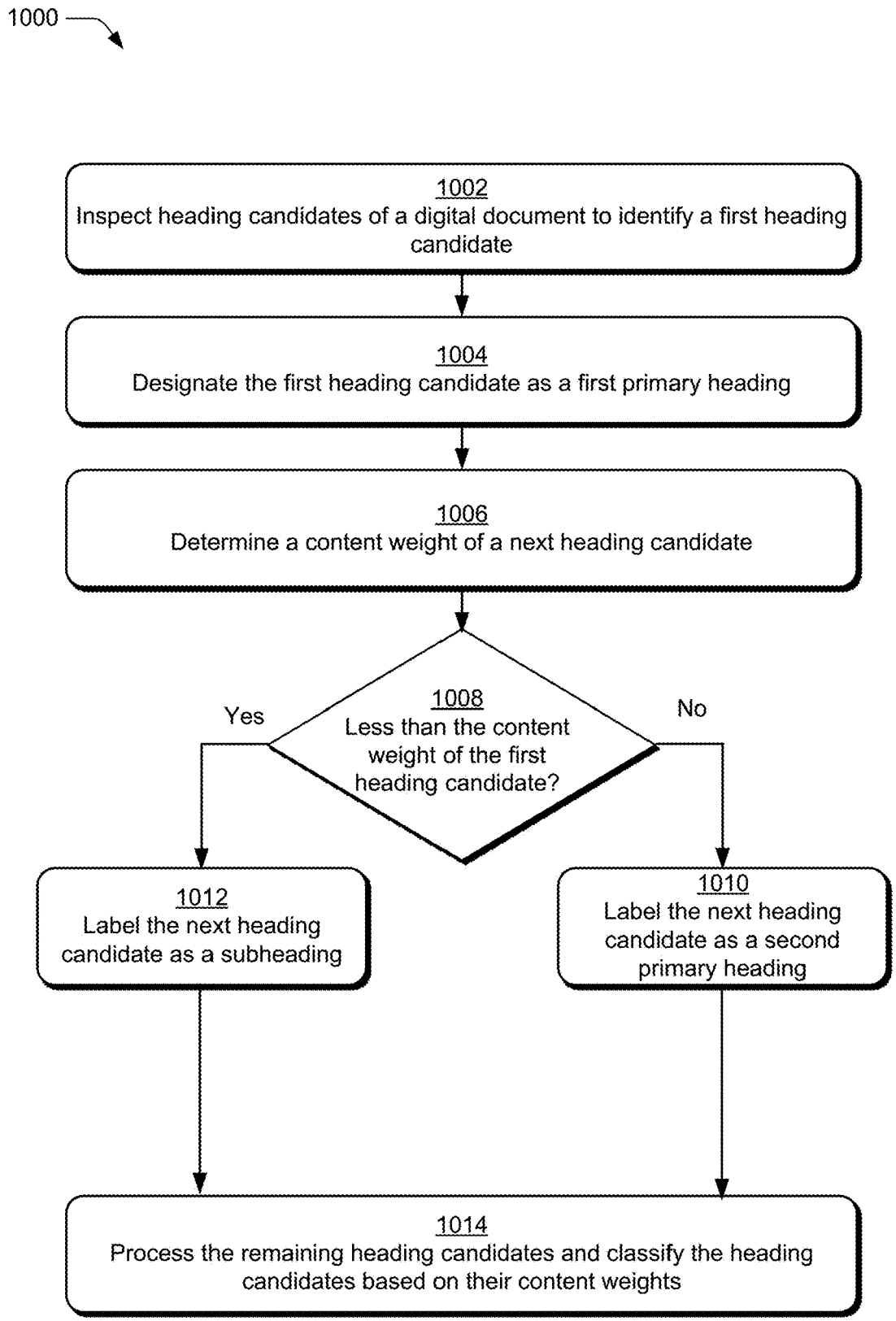
FIG. 10 depicts an example procedure for determining heading type for different heading candidates.

FIG. 10 depicts an example procedure 1000 for determining heading type for different heading candidates. The procedure 1000, for instance, is performed in conjunction with the procedures 800, 900 for determining a correct heading level as part of generating a sectioned version of a digital document.

Step 1002 inspects heading candidates of a digital document to identify a first heading candidate. For instance, the classification module 126 processes the headings from the heading buckets 720 in an order that correlates to the order of the headings from the original digital document 114, e.g., a reading order starting from the beginning of the digital document. In at least one implementation, the first heading candidate represents a first heading detected after an initial title heading, e.g., a title instance of the special headings 120.

Step 1004 designates the first heading candidate as a first primary heading. The classification module 126, for example, labels the first heading candidate as a first primary heading 120, e.g., a first top-level heading of the digital document 114.

Step 1006 determines a content weight of a next heading candidate. Generally, content weight represents a way of representing visual attributes of a heading candidate that assists in determining a relative heading level for a heading candidate. One example way of calculating content weight utilizes the formula:

$$\text{ContentWeight} = (\text{FontSize} + \text{BoldWeight} + \text{ItalicWeight}) * (\text{CentrallyAlignedWeight}) * (\text{AllCapsWeight}), \quad \text{Formula 1}$$

where BoldWeight, Italic Weight, CentrallyAlignedWeight, and AllCapsWeight represent "emphasis constants" that can each be configured using different values, such as depending on linearization of data used to calculate content weight. Non-limiting examples of such values include:

BoldWeight=10 if Bold, else 0
ItalicWeight=5 if Italic, else 0
CentrallyAlignedWeight=1.15 if centrally aligned, else 1
AllCapsWeight=1.15 if all characters in the heading candidate are capitals, else 1

Step 1008 (decision) determines whether the content weight of the next heading candidate is less than the content weight of the first heading candidate. The classification module 126, for example, calculates the content weight of the first heading candidate and the next heading candidate, and compares the two. If the content weight of the next heading candidate is not less than the first heading candidate (No), Step 1010 labels the next heading candidate as a second primary heading. The next heading candidate, for instance, is labeled as the same heading level as the first primary heading.

If the content weight of the next heading candidate is less than the first heading candidate (Yes), step 1012 labels the next heading candidate as a subheading. For instance, the classification module 126 designates the next heading candidate as a subheading that is beneath the first primary heading in a heading hierarchy of the digital document.

Step 1014 processes the remaining heading candidates and classifies the heading candidates based on their content weights. The classification module 126, for example, iterates through the heading candidates in order of their placement in the digital document 114, and compares a content weight of each heading candidate to that of a previous heading candidate, and/or to a content weight of a primary heading. Thus, subsequent heading candidates may be designated as primary headings, subheadings, sub-subheadings, and so on. For instance, if a subsequent heading candidate that occurs after an identified subheading is determined to have a lower content weight than the subheading, the subsequent heading candidate is designated as a subheading of the previous subheading. Thus, multiple hierarchical levels of subheadings beneath a primary heading can be identified and labeled.

In at least one implementation, as part of iterating over the remaining heading candidates, a page break section may be encountered. For instance, where more than a bottom third of a page of the digital document 114 is blank (e.g., contains no content), this may indicate that a page break was inserted. Thus, a subsequent page may represent a new section. Accordingly, when a page break is detected and a subsequent page starts with a heading candidate, the heading candidate can be designated as a primary heading. In this scenario, the procedure 1000 may reinitiate utilizing the primary heading and then designating subsequent primary headings and subheadings based on content weight comparison, as described above.

As discussed above with reference to the procedure 800, when a document directory 136 is generated based on a sectioned digital document, the document directory may omit some lower levels of headings. For instance, consider that n hierarchical levels of headings are identified and labeled for a sectioned document 134 using the procedure 1000, where n ≥3. In this scenario, a document directory 136 for the sectioned document 134 may be configured to include (n−i) hierarchical levels of headings, where n ≥i≥1.

Figure 11:
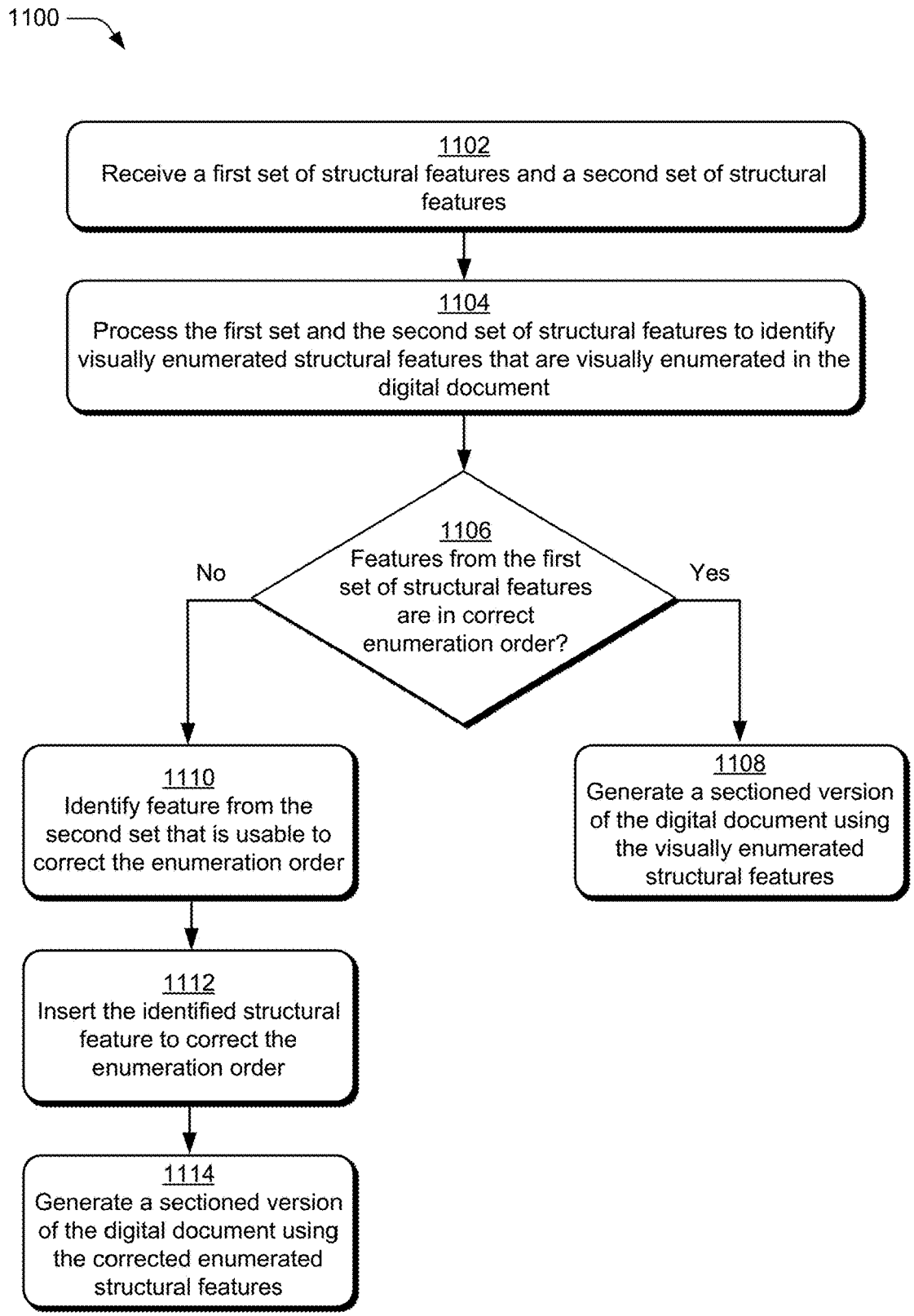
FIG. 11 depicts an example procedure for correcting enumeration of headings.

FIG. 11 depicts an example procedure 1100 for correcting enumeration of headings. The procedure 1100, for instance, is performed in conjunction with the procedures 800-1000 for correcting enumerated headings that are identified and classified as part of generating a sectioned version of a digital document.

Step 1102 receives a first set of structural features that represent structural features designated as headings of a digital document, and a second set of structural features determined to be likely headings of the digital document. The first set of structural features, for instance, represents confirmed headings from the heading buckets 720 (e.g., the primary headings 120 and the subheadings 120), and the second set of structural features represents the high confidence features 702. Generally, some structural features from the heading buckets 720 and the high confidence features 702 may not be the same, such as when some high confidence features 702 were placed into candidate buckets 714 that were eventually rejected as part of the rejected buckets 718 due to low average buckets scores 716, such as described previously.

Step 1104 processes the first set and the second set of structural features to identify visually enumerated structural features that are visually enumerated in the digital document. The classification module 126, for example, inspects the first and second set of structural features (e.g., using computer vision techniques) to identify those structural features that include some form of enumeration, such as at the beginning of the structural features. As used herein, "enumeration" refers to utilizing various conventions for labeling structural features to indicate a particular order of the structural features within a digital document. Enumeration, for instance, can include utilizing numbers in order (e.g., 1, 2, 3, . . . ), letters (A, B, C, . . . ), and/or other characters that can be interpreted as specifying an order to structural features. Further, various character types can be combined for enumeration, such as "A.1," "A.2," "B.1," "B.2," and so forth.

In at least one implementation, the classification module 126 utilizes regular expression matching to identify enumerated structural features. Examples of such regular expressions include:

[0-9|A-Z]{1,2} to match enumerations such as (A, B), (AA, AB), (A1, A2), (1A, 1B), (1, 2), (10, 11);

[0-9|A-Z]{1,2}[: |. |−][0-9|A-Z]{0,2} to match enumerations such as (A.A, A.B), (A.1, A.2), (AA:AB), A1:A2);

[0-9|A-Z]{1,2}[: |. |−][0-9|A-Z]{1,2}[: |. |−][0-9|A-Z]{0,2}: to match enumerations such as (A.A.1, A.A.2), (AA.BB.1, AA.BB.2);

[0-9|A-Z]*[|: |\t|−|_|#] [0-9|A-Z]{1,2}: to match enumerations such as (Chapter 1, Chapter 2) (Chapter #1, Chapter #2), (Chapter A1, Chapter A2).

These regular expressions and enumerations are presented for purpose of example only, and it is to be appreciated that a variety of different enumeration types and regular expressions can be employed within the scope of the implementations described herein.

As part of identifying the enumerated structural features, the classification module 126 generates a list ("enumerated_list"), where each structural feature in the list include the properties {enumeration_label, is_confirmed_heading_candidate, heading_level, actual_instance}. In these properties, "enumeration_label" identifies the specific enumeration applied to a structural feature; "is_confirmed_heading_candidate" refers whether a particular structural feature belongs to structural features from the first set, e.g., confirmed headings from the heading buckets 720; and "heading_level" specifies whether the structural feature is a primary heading or one of several hierarchical levels of subheadings. For instance, as part of classifying the headings in the procedure 1000, the classification module 126 designates the primary headings as "H1", the first level of subheadings as "H2", second level headings as "H3", and so forth; "actual_instance" refers to the full set of characters of the enumerated structural feature.

Step 1106 processes the visually enumerated structural features to determine whether the visually enumerated structural features from the first set of structural features are in correct enumeration order. The classification module 126, for example, processes the list of enumerated structural features to determine whether structural features from the first set of structural features (designated headings from the heading buckets 720) are in correct enumeration order based on their original order in the original digital document.

For instance, the classification module 126 utilizes an enumeration check function (e.g., "are_features_in_enumerated_order,") which takes two enumerated structural features from the list (current, next) and outputs an indication of whether they are in order. This can be done by incrementing the ASCII value of last character of current_feature in the list, then current_feature should match the next_feature with special handling of features ending in 9 and Z.

To do this, the classification module 126 determines whether cur_feature.is_confirmed_heading_candidate is true, and if so, checks the confirmed previous feature against the current_feature using the enumeration check function. In performing this check, prev_elem is to have a heading level (e.g., H1, H2, and so forth) that matches current_feature.

If the visually enumerated structural features from the first set of structural features are in correct enumeration order ("Yes"), step 1108 generates a sectioned version of the digital document using the visually enumerated structural features from the first set of structural features. The presentation module 128, for instance, arranges the features from the first set of structural features in enumerated order as various headings (e.g., headings, subheadings, and so forth) of the sectioned document 134 and a corresponding document directory 136.

If the visually enumerated structural features from the first set of structural features are not in correct enumeration order ("No"), step 1110 searches the visually enumerated structural features to identify an enumerated structural feature from the second set that is usable to correct the enumeration order of the structural features from the first set. The classification module 126, for example, searches the list of enumerated structural features for a probable heading candidate from the second set of structural features that is usable to correct the enumeration order, e.g., to fill in a missing enumerated heading.

For example, the classification module 126 continues with the enumeration check function to determine that prev_feature is not in order, and traverses the enumerated_list in backward direction to collect the features from the second set of structural features where are_features_in_enumerated_order(elem, curr_elem) is true. The classification module 126 then stops when a confirmed heading instance of same heading level or higher heading level from the second set of structural features is located.

Step 1112 inserts the identified structural feature from the second set of structural features into the first set of structural features to correct the enumeration order of the first set of structural features. The classification module 126, for example, locates a structural feature from the second set of structural features in the list that represents a missing enumerated heading from the first set of structural features. The classification module 126 then inserts the located structural feature adjacent an enumerated structural feature from the first set to represent adjacent headings in a sectioned digital document 114.

Step 1114 generates a sectioned version of the digital document using the corrected enumerated structural features. The presentation module 128, for instance, arranges the corrected enumerated structural features in enumerated order as various headings (e.g., primary headings, subheadings, and so forth) of the sectioned document 134 and a corresponding document directory 136.

Accordingly, technique described herein enable headings of a digital document to be automatically and accurately identified and labeled to generate interactive versions of digital documents that can be navigated via interaction with the identified headings.

Having described example procedures in accordance with one or more implementations, consider now an example system and device that can be utilized to implement the various techniques described herein.

Example System and Device

Figure 12:
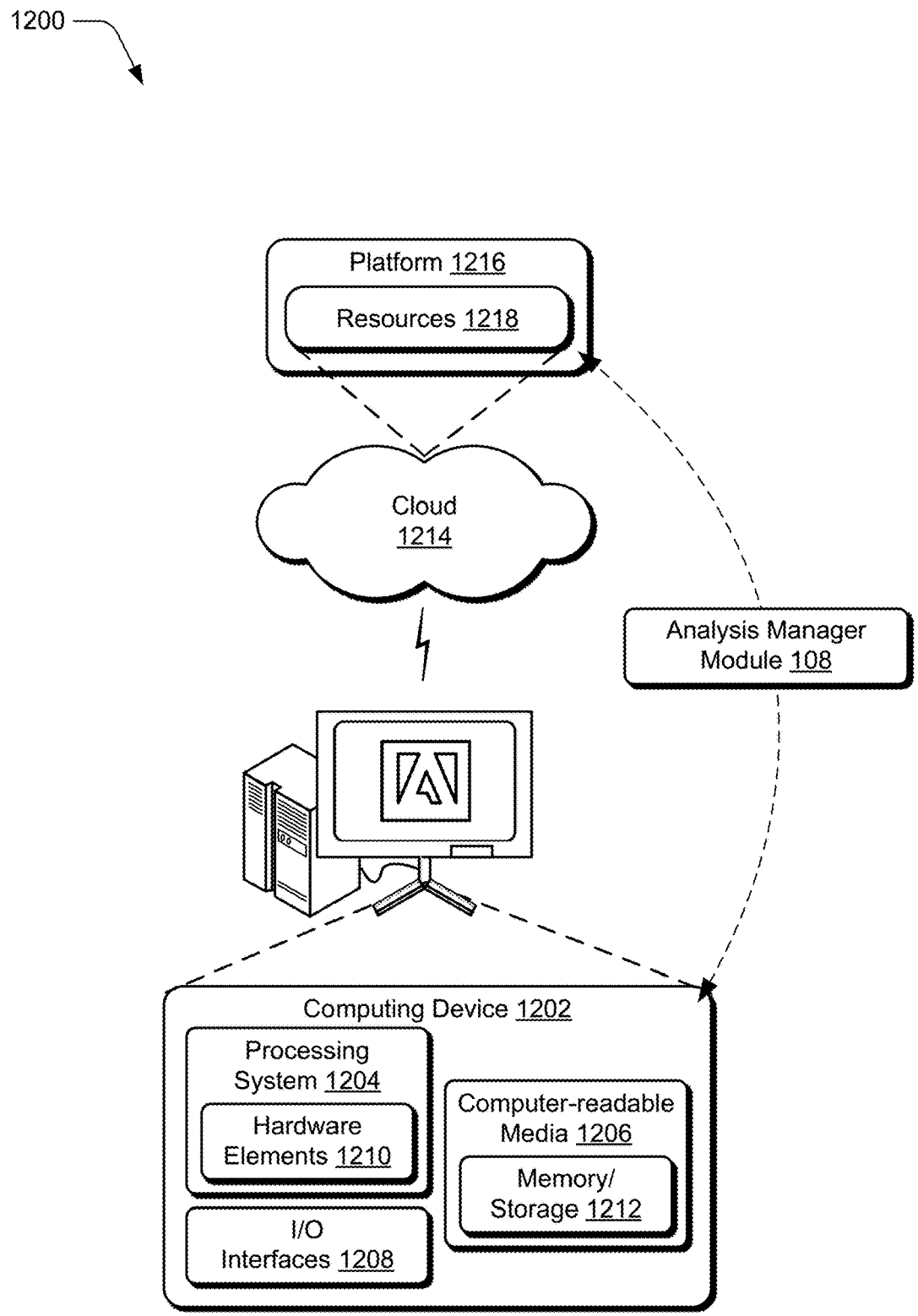
FIG. 12 illustrates an example system including various components of an example device that can be implemented as any type of computing device as described and/or utilized with reference to FIGS. 1-11 to implement aspects of the techniques described herein.

FIG. 12 illustrates an example system generally at 1200 that includes an example computing device 1202 that is representative of one or more computing systems and/or devices that may implement the various techniques described herein. This is illustrated through inclusion of the analysis manager module 108. The computing device 1202 may be, for example, a server of a service provider, a device associated with a client (e.g., a client device), an on-chip system, and/or any other suitable computing device or computing system.

The example computing device 1202 as illustrated includes a processing system 1204, one or more computer-readable media 1206, and one or more I/O interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below. [ono] Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se or transitory signals. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:
1. A system comprising:
at least one processor; and
at least one computer-readable storage media storing instructions that are executable by the at least one processor to perform operations including:
extracting structural features from a digital document;

determining feature scores for the structural features, each feature score indicating a likelihood that a respective structural feature represents a heading of the digital document;

sorting the structural features by their respective feature scores to identify a set of high confidence features that represent structural features most likely to correspond to headings of the digital document and a different set of structural features that are less likely than the high confidence features to correspond to headings of the digital document;

classifying the high confidence features based on their visual attributes into different categories of headings;

processing the high confidence features to identify enumerated headings in the high confidence features;

determining that the enumerated headings in the high confidence features are not in correct enumeration order by determining that an enumerated heading is missing between two enumerated headings from the high confidence features;

identifying an enumerated heading from the different set of structural features that is usable to correct the enumeration order of the enumerated headings of the high confidence features;

inserting the enumerated heading from the different set of structural features into the enumerated headings of the high confidence features to correct the enumeration order of the high confidence features; and generating a sectioned version of the digital document that is sectioned based on the different categories of headings, and a document directory that includes at least some of the headings, the sectioned version of the digital document being navigable via interaction with the document directory.

2. A system as described in claim 1, wherein said extracting further comprises extracting the visual attributes of the structural features for use in said classifying the high confidence features.

3. A system as described in claim 1, wherein said determining the feature scores comprises inputting the structural features into a machine learning model, and receiving the feature scores as output from the machine learning model.

4. A system as described in claim 1, wherein said sorting the structural features further comprises identifying a set of mid confidence features that are less likely than the high confidence features to correspond to headings of the digital document, and identifying a set of low confidence features that are least likely to represent headings of the digital document, wherein the mid-confidence features correspond to the different set of structural features and wherein the operations further include:

classifying at least some of the mid confidence features into the different categories of headings; and omitting the low confidence features from the categories of headings.

5. A system as described in claim 1, wherein said classifying the high confidence features comprises labeling at least some of the high confidence features as primary headings or subheadings based on a comparison of the visual attributes of the high confidence features.

6. A system as described in claim 1, wherein said classifying the high confidence features comprises labeling at least some of the high confidence features as primary headings or subheadings based on a comparison of the visual attributes of the high confidence features, the visual attributes including for each of the high confidence features a combination of text character formatting and feature alignment in the digital document.

7. A system as described in claim 1, wherein the different categories of headings include multiple hierarchical levels of headings, and wherein said generating the document directory comprises omitting at least one of the hierarchical levels of headings from the document directory.

8. A system as described in claim 1, wherein the operations further include displaying the document directory and a selectable control that is selectable to expand the document directory to include content of the digital document along with the at least some headings.

9. A system as described in claim 1, wherein the operations further include:

categorizing the high confidence features into different feature buckets that each include structural features that share common visual attributes relative to the digital document;

augmenting the feature buckets by inserting at least some structural features from the different set of structural features into respective feature buckets based on the at least some structural features having matching visual attributes with the respective feature buckets;

generating, by the at least one computing device, a set of heading buckets by:

calculating an average bucket score for individual augmented feature buckets;

rejecting one or more augmented feature buckets with an average bucket score below a bucket score threshold; and incorporating augmented feature buckets with an average feature score above the bucket score threshold into the set of heading buckets, wherein said classifying further comprises classifying structural features from the heading buckets into the different categories of headings.

10. A method implemented by at least one computing device, the method comprising:

determining, by the at least one computing device, feature scores for structural features of a digital document that includes headings and content adjacent at least some of the headings, each feature score indicating a likelihood that a respective structural feature represents a heading of the digital document;

sorting, by the at least one computing device, the structural features by their respective feature scores to identify a first set of structural features that exceed a heading likelihood threshold, and a second set of structural features that are below the heading likelihood threshold;

categorizing, by the at least one computing device, the first set of structural features into different feature buckets that each include structural features that share common visual attributes relative to the digital document;

augmenting, by the at least one computing device, the feature buckets by inserting at least some structural features from the second set of structural features into respective feature buckets based on the at least some structural features having matching visual attributes with the respective feature buckets;

generating, by the at least one computing device, a set of heading buckets by:

calculating an average bucket score for individual augmented feature buckets;

rejecting one or more augmented feature buckets with an average bucket score below a bucket score threshold;

incorporating augmented feature buckets with an average feature score above the bucket score threshold into the set of heading buckets;

generating, by the at least one computing device, a sectioned version of the digital document that is sectioned based on headings identified in the heading buckets; and generating a document directory that includes the headings from the sectioned version of the document and omits at least some content of the sectioned version of the digital document, the document directory: enabling navigation of the sectioned version of the digital document via interaction with the document directory and including a selectable control that is selectable to expand and collapse the at least some content relative to at least some of the headings.

11. A method as described in claim 10, wherein the second set of structural features have feature scores between the heading likelihood threshold and a second heading likelihood threshold, and said sorting further identifies a third set of structural features having feature scores below the second heading likelihood threshold such that the third set of structural features are omitted from the feature buckets.

12. A method as described in claim 10, wherein the visual attributes comprise at least one of structural feature alignment relative to the digital document, or enumeration labels applied to the structural features.

13. A method as described in claim 10, further comprising labeling at least some of the headings in the heading buckets as primary headings or subheadings based on a comparison of the visual attributes of the headings, the visual attributes including for each of the headings a combination of text character formatting and feature alignment in the digital document.

14. A method as described in claim 10, further comprising:

processing the headings from the first set of structural features to identify enumerated headings;

determining that the enumerated headings from the first set of structural features are not in correct enumeration order;

identifying an enumerated heading from the second set of structural features that is usable to correct the enumeration order of the enumerated headings of the first set of structural features; and inserting the enumerated heading from the second set of structural features into the enumerated headings of the first set of structural features to correct the enumeration order of the headings.

15. A method as described in claim 14, wherein said determining that the enumerated headings from the first set of structural features are not in order comprises determining that an enumerated heading from the first set of structural features is missing, and wherein said identifying the enumerated heading from the second set of structural features comprises identifying an enumerated heading from the second set of structural features that matches the missing enumerated heading from the first set of structural features.

16. A method implemented by at least one computing device, the method comprising:

extracting, by the at least one computing device, structural features from a digital document;

sorting, by the at least one computing device, the structural features to identify:

a first set of structural features that represent structural features with feature scores above a likelihood threshold and that most likely to correspond to headings of the digital document;

a second set of structural features the represent structural features with feature scores below the likelihood threshold;

categorizing, by the at least one computing device, the first set of structural features into different feature buckets that each include structural features that share common visual attributes relative to the digital document;

augmenting, by the at least one computing device, the feature buckets by inserting at least some structural features from the second set of structural features into respective feature buckets based on the at least some structural features having matching visual attributes with the respective feature buckets generating, by the at least one computing device, a set of heading buckets by:

calculating an average bucket score for individual augmented feature buckets;

rejecting one or more augmented feature buckets with an average bucket score below a bucket score threshold;

incorporating augmented feature buckets with an average feature score above the bucket score threshold into the set of heading buckets;

classifying, by the at least one computing device, the structural features from the heading buckets based on their visual attributes into different categories of headings;

generating, by the at least one computing device, a sectioned version of the digital document that is sectioned based on the different categories of headings; and generating, by the at least one computing device, a document directory that includes at least some of the headings.

17. A method as described in claim 16, wherein the sectioned document includes a primary heading and a subheading beneath the primary heading, the method further comprising:

determining that the primary heading is not in correct enumeration order in the sectioned document;

identifying an enumerated heading from the second set of structural features that is usable to correct the enumeration order of the primary heading; and inserting the enumerated heading from the second set of structural features adjacent the primary heading to correct the enumeration order of the sectioned document.

18. A method as described in claim 16, wherein the sectioned document includes a primary heading and a subheading beneath the primary heading, wherein the primary heading is selectable to expand and collapse content presented beneath the primary heading and content presented beneath the subheading.

19. A method as described in claim 16, wherein the digital document includes content adjacent the at least some of the headings, and the document directory includes a selectable control that is selectable to expand and collapse the content relative to the at least some of the headings.

20. A method as described in claim 16, wherein said sorting further identifies a third set of structural features having feature scores below a further likelihood threshold such that the third set of structural features is omitted from the feature buckets.

\* \* \* \* \*